United States Patent [19]

King

[11] 4,271,719
[45] Jun. 9, 1981

[54] BICYCLE LEVER ASSEMBLY

[76] Inventor: Foster King, 1149 N. Hacienda, LaPuente, Calif. 91744

[21] Appl. No.: 48,083

[22] Filed: Jun. 13, 1979

[51] Int. Cl.³ .............................................. G05G 1/14
[52] U.S. Cl. ................................................... 74/594.2
[58] Field of Search ........................... 74/594.1, 594.2; 280/260

[56] References Cited

U.S. PATENT DOCUMENTS 657,859 9/1900 Cottrell ............................... 74/594.2

FOREIGN PATENT DOCUMENTS 1064879 10/1952 France .................................... 74/594.1
415833 11/1946 Italy ........................................ 74/594.2
359050 1/1962 Switzerland ............................ 74/594.2
191885 1/1923 United Kingdom .................... 74/594.1

Primary Examiner—Kenneth Dorner
Attorney, Agent, or Firm—Boniard I. Brown

[57] ABSTRACT

An improved bicycle lever transmission assembly, which may be in kit form, is provided for installation on a conventional bicycle having a pedal crankshaft with a journalled portion rotatably mounted in a bicycle frame having a pair of pedal cranks extending oppositely from the journalled portion. The lever transmission assembly or kit includes a pedal crank with a pivot boss extending therefrom in spaced parallel relation with the journalled crankshaft portion, a drive sprocket to mesh with a drive chain to drive a bicycle wheel, the drive sprocket being rotatably mounted on the crankshaft journalled portion adjacent a pedal crank, a fixed lever link affixed to the drive sprocket with an end portion thereof extending beyond the pitch diameter of the fixed lever link, and leverage transmission components including at least one lever link pivotally connected with the pivot boss and with the extending end portion of the fixed lever. The lever transmission components may include a second lever link having first and second end portions respectively pivotally connected to the drive sprocket and to the first lever link, and a third lever link having first and second end portions adapted respectively for connection to the extending end portion of the fixed lever link and to an intermediate portion of the second lever link.

6 Claims, 6 Drawing Figures

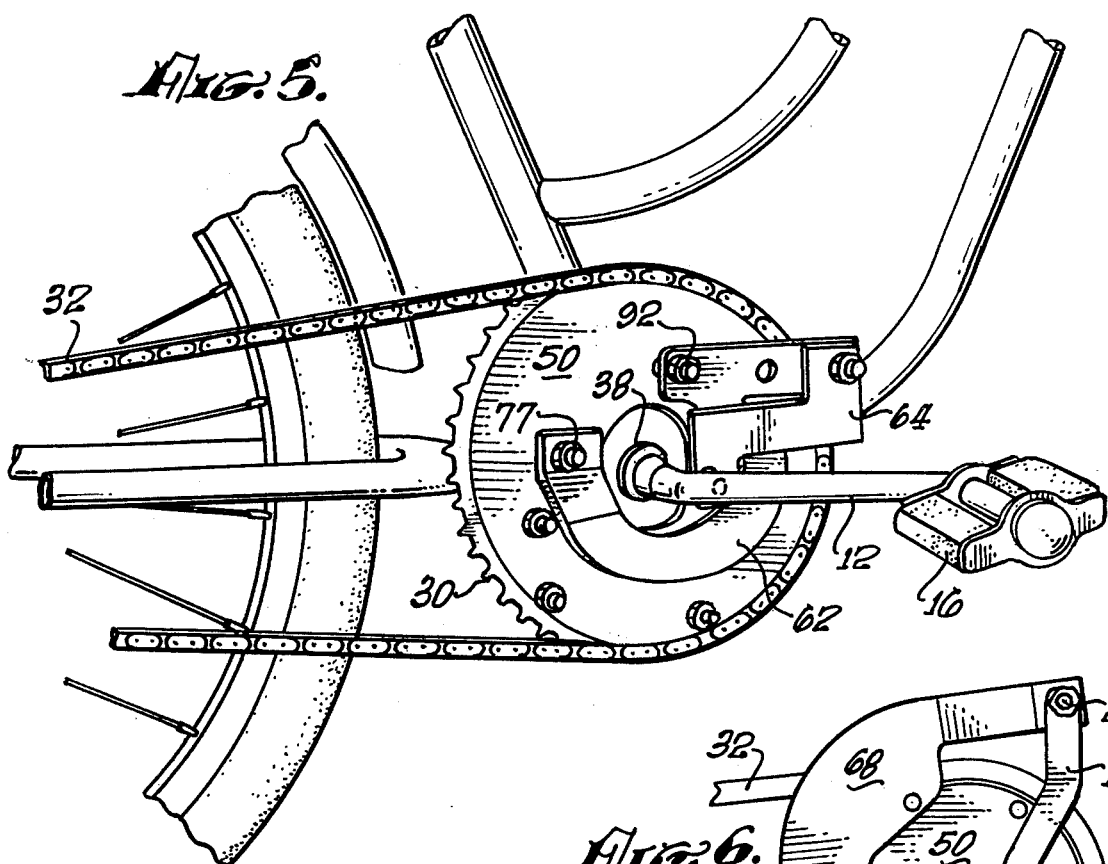
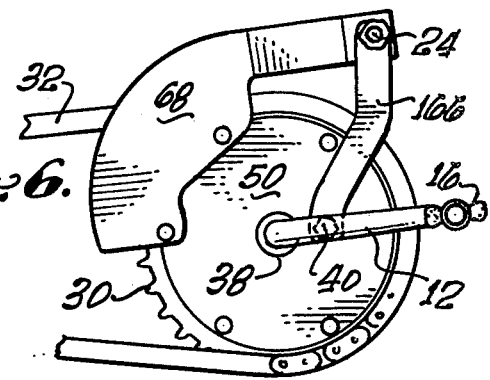
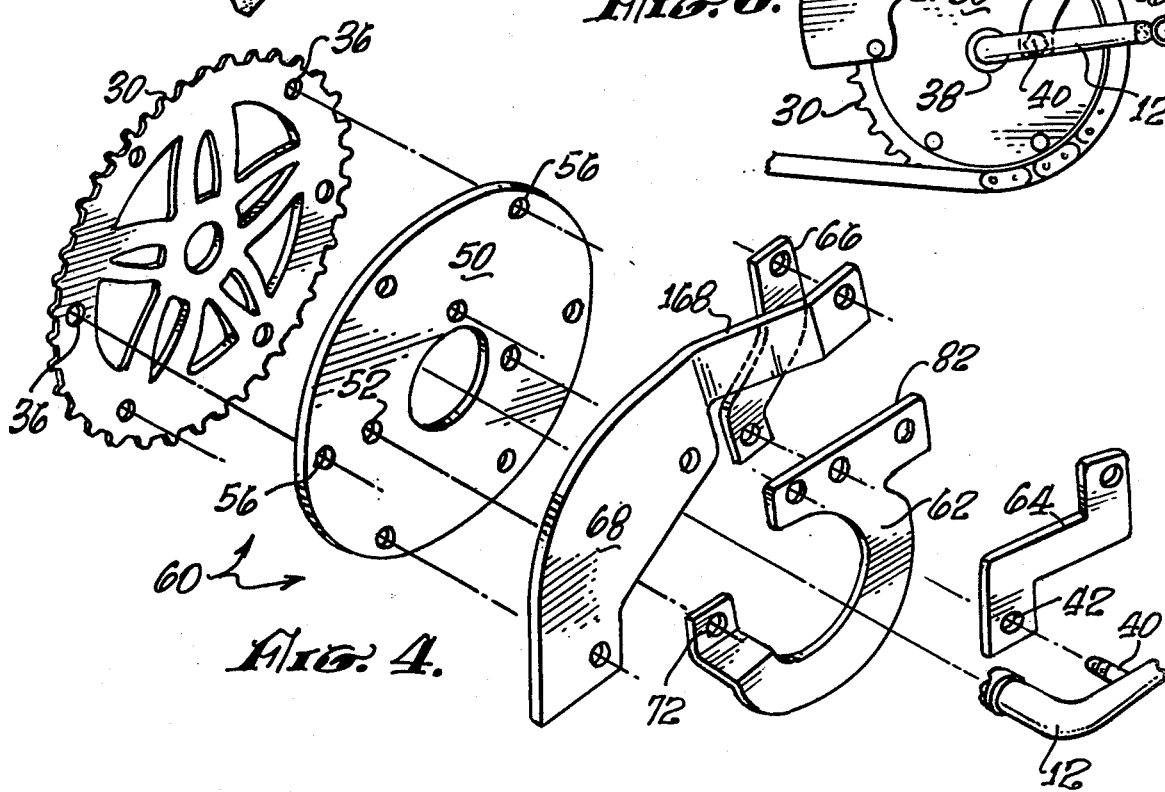

BICYCLE LEVER ASSEMBLY

BACKGROUND OF THE INVENTION

The present invention relates generally to bicycle drive transmission assemblies, and more particularly to improved bicycle lever transmission assemblies wherein lever links transmit rotary driving force and motion of the pedal crankshaft to the drive sprocket to reduce required pedal force.

In conventional bicycles, as well as related three and four-wheeled vehicles or pedal-driven boats, and the like, driving force appplied by the feet of the user to pedals oppositely disposed on a crankshaft, is transmitted to a driven wheel, or equivalent output component, via a chain drive and a drive sprocket on the pedal crankshaft.

It has been necessary, in order to provide sufficient driving force to the driven wheel in such vehicles, in some applications or to accommodate some individuals, to provide additional mechanisms to provide alternate gear ratios to adapt the drive mechanisms to various operating conditions and for use by persons of reduced capacity for providing pedal effort.

It is therefore an object of the present invention to provide an improved bicycle lever transmission assembly intermediate the pedals and drive sprocket of a bicycle.

It is an object of the invention to provide such a lever transmission assembly of simplified and economical construction.

It is an object of the invention to provide such a lever transmssion assembly which comprises lever links intermediate the pedals and drive sprocket.

An object of the invention is to provide an improved bicycle lever transmission assembly for reducing the forces required for application to the pedals.

SUMMARY OF THE INVENTION

The foregoing objects, as well as other objects and advantages which will become apparent from the detailed description of the preferred embodiment, are attained in an improved bicycle lever transmission assembly installed or installable intermediate the pedals and the drive sprocket of a bicycle wherein a pedal crankshaft has a journalled portion rotatably mounted in a bicycle frame and wherein a pair of pedal cranks extend oppositely from the journalled portion.

The lever transmission assembly, or the kit components for providing the assembly, include a pedal crank having a pivot boss to extend in spaced parallel relation to the journal crankshaft portion, a drive sprocket rotatably mounted on the crankshaft journal portion adjacent a pedal crank and adapted to mesh with a drive chain for driving a bicycle driven wheel, a fixed lever link fixed to the drive sprocket and having an end portion extending beyond its pitch diameter, and leverage transmission means including at least one lever link pivotally connected with the pivot boss and pivotally connected with the fixed lever extending end portion.

The lever transmission assembly may include second and third lever links. In such an arrangement, the first lever link is adapted for pivotal connection to the pivot boss, a second lever link pivotally connected to the drive sprocket and pivotally connected to the first lever link, and a third lever link having respective end portions pivotally connected to the extending end portion of the fixed lever link and to an intermediate portion of the second lever link, respectively.

BRIEF DESCRIPTION OF THE DRAWING

FIG. 4 is an exploded perspective view of the components of the lever transmission assembly of FIGS. 1 and 2;

FIG. 5 is a partial elevational view of a modified form of the bicycle lever transmission assembly of the invention in operative relation with associated components of a conventional bicycle assembly; and FIG. 6 is a partial elevational view of another modified form of bicycle lever transmission assembly of the invention.

DESCRIPTION OF THE PREFERRED EMBODIMENT

Figure 1:
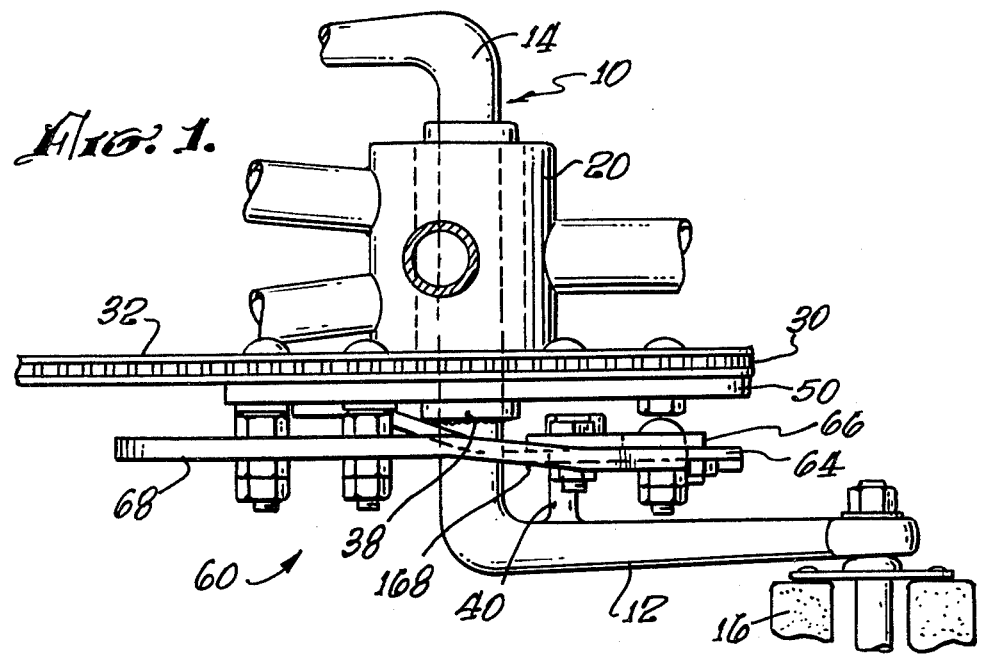
FIG. 1 is a partial plan view, showing components of a preferred embodiment of the lever transmission assembly of the invention, in operative relation with co-operating components of a conventional bicycle assembly.
Figure 2:
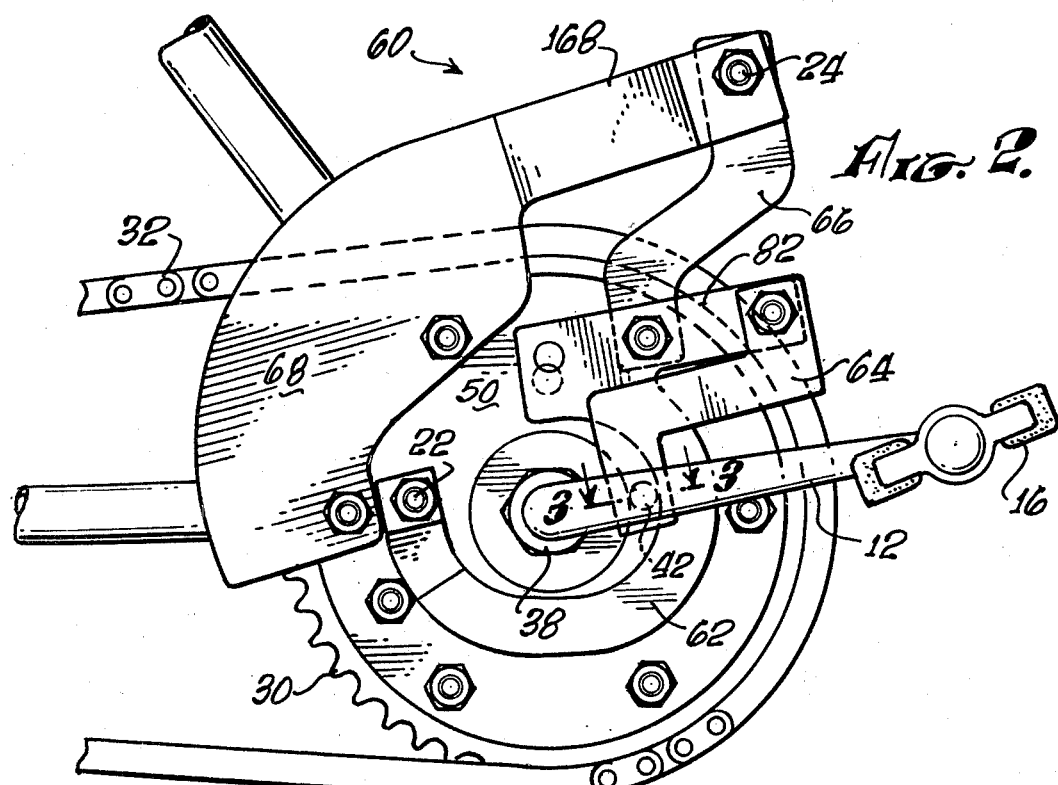
FIG. 2 is an elevational view of the assembly of FIG. 1.
Figure 3:
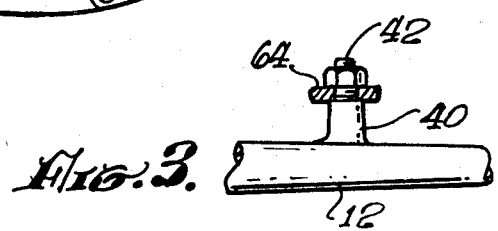
FIG. 3 is a fragmentary view showing a portion of a pedal crank arm of the assembly of FIGS. 1 and 2, and showing a pivot boss thereon.

FIGS. 1 and 2 illustrate portions of a conventional bicycle apparatus with which a lever transmission assembly of the invention is installed. The bicycle assembly includes a bearing housing 20 of a bicycle frame having a pedal crankshaft 10 which has pedal cranks 12, 14 extending in opposite directions from a central crankshaft portion journalled in a bearing supported in bearing housing 20. A pedal 16 is rotatably mounted at the outer end portion of each of the crank arms 12, 14. A drive chain 32 interconnects a drive sprocket 30 with a driven sprocket (not shown) at the rear wheel of the bicycle.

The drive sprocket 30 is mounted on the central portion of crankshaft 10 and is retained by a collar 38 integral therewith. Whereas the sprocket is conventionally mounted for rotation with the crankshaft, in the assembly of the invention, the sprocket is rotatable relative to the central or journal portion of the crankshaft.

The transmission assembly of the invention includes a transmission plate 50 rigidly bolted to one side of the sprocket 30, a pivot boss on pedal crank 12 spaced from and parallel to the central journal portion of the pedal crankshaft, and lever link members hereinafter described.

FIGS. 1, 2 and 4 illustrate a preferred embodiment of bicycle lever transmission assembly according to the invention. The lever transmission 60 includes a fixed lever link 68 rigidly secured to transmission plate 50 and to sprocket 30, and having an extension portion 168 extending beyond the pitch diameter of the drive sprocket. A first lever link 64 has a first end portion in pivotal engagement at 42 with the pivot boss 40 on the pedal crank. A third lever link 66 has a first end portion pivotally connected at pivot 24 to extension portion 168 of the fixed lever, and has its second end portion pivotally connected to said intermediate portion of the second or sickle lever link 62.

A second or sickle link 62 has a first end portion pivotally connected at 22 to the transmission plate 50, an arcuate portion extending about the crankshaft journal, an intermediate portion 82 and a second end portion pivotally connected to a second end portion of the first lever link 64.

In this train of lever links, the lever links are arranged with their driven ends at successively smaller radii from the center of rotation of the assembly, which is axis of rotation of the pedal crankshaft journal portion. Through the interaction of the several components of the lever transmission 60, the effort or force required of the person using the bicycle, in terms of load applied to the pedals, is appreciably reduced from that required by a conventional pedal crank assembly, wherein sprocket 30 is directly secured to the pedal crankshaft 10.

Sprocket 30 and transmission plate 50 have a plurality of registering openings, typically openings 36 and 56, through which fasteners, such as bolts, are extended rigidly to secure the components together or to serve as pivots for the components, in respective embodiments of the invention.

FIG. 5 shows a modified and simplified form of lever transmission assembly according to the invention, wherein the sickle link 62 is rigidly secured to the transmission plate 50 by appropriate fasteners or bolts 77, 92, against relative rotation to any material extent. The transmission of driving force from the pedals is thereby altered, and the arrangement serves as a means of adjustment to adapt the lever transmission assembly of the invention to the requirements of the user.

A simplified embodiment of the invention is in FIG. 6, wherein a single lever link 166 is pivotally connected to the extension portion of the fixed link 68, and has its other end portion pivotal on the pivot boss 40.

The inventor claims:

1. An improved bicycle lever transmission assembly for a bicycle wherein a pedal crankshaft has a journalled portion rotatably mounted in a frame and a pair of pedal cranks with pedals extending oppositely from the journal portion, and a drive sprocket having the same rotational axis as and rotatable by the pedal cranks meshes with a drive chain to drive a wheel of the bicycle and is rotatably mounted on the cranshaft journal portion adjacent to one of the pedal cranks, said transmission assembly being intermediate the pedals and drive sprocket and comprising:
    a pivot boss extending from one of the pedal cranks in spaced parallel relation with said journal crankshaft portion,
    a fixed lever link affixed to the drive sprocket, the sprocket having a pitch diameter beyond which an end portion of the fixed lever link extends, and
    leverage transmission means including a lever linkage interconnected between the pivot boss and the extending end portion of the fixed lever, said linkage comprising at least one lever link pivotally connected with the pivot boss.

2. An improved bicycle lever transmission assembly according to claim 1, and further including:
    a second lever link having an intermediate portion and first and second end portions, said first end portion being pivotally connected to the drive sprocket and said second end portion being pivotally connected with said one lever link at its end portion opposite from its pivotal connection with the pivot boss, and
    a third lever link having a first end portion pivotally connected to said extending end portion of the fixed lever and a second end portion pivotally connected with said intermediate portion of the second lever link.

3. An improved bicycle lever transmission assembly according to claim 1, wherein
    said fixed lever link has an intermediate portion and first and second end portions, said first end portion being connected to the drive sprocket and said second end portion being pivotally connected with the one lever link at its end portion opposite from its pivotal connection with the pivot boss.

4. As an article of commerce, a leverage transmission kit for installation on a bicycle wherein a pedal crankshaft has a journalled portion rotatably mounted in a frame and a pair of pedal cranks with pedals extending oppositely from the journal portion, and a drive sprocket having the same rotational axis as and rotatable by the pedal cranks meshes with a drive chain to drive a wheel of the bicycle and is rotatably mounted on the crankshaft journal portion adjacent to one of the pedal cranks, said transmission kit being intermediate the pedals and drive sprocket and comprising:
    a pedal crank having a pivot boss adapted to extend in spaced parallel relation with said journal crankshaft portion,
    a fixed lever link and affixed to the drive sprocket, the sprocket having a pitch diameter beyond which an end portion of the fixed lever link extends, and
    leverage transmission means including a lever linkage adapted for interconnection between the pivot boss and the extending end portion of the fixed lever, said linkage comprising at least one lever link adapted for pivotal connection with the pivot boss.

5. A transmission kit according to claim 4, and further including:
    a second lever link having an intermediate portion and having first and second end portions, respectively adapted for pivotal connection to the drive sprocket and to said one lever link at its end portion opposite from its pivotal connection with the pivot boss, and
    a third lever link having first and second end portions adapted respectively for pivotal connection to said extending end portion of the fixed lever link and to said intermediate portion of the second lever link.

6. A transmission kit according to claim 3, wherein
    said fixed lever link has an intermediate portion and first and second end portions, said first end portion being adapted for connection to the drive sprocket and said second end portion being adapted for pivotal connection with the one lever link at its end portion opposite from its pivotal connection with the pivot boss.

* * * * *